No. 663,277. Patented Dec. 4, 1900.
L. HORVATH.
LAWN SPRINKLER.
(Application filed May 23, 1900.)
(No Model.)

Witnesses
Mattie McGinnis
Ada M. Shoulters

Inventor
Louis Horvath
By Hazard & Harpham
Attorneys

UNITED STATES PATENT OFFICE.

LOUIS HORVATH, OF LOS ANGELES, CALIFORNIA, ASSIGNOR OF ONE-HALF TO JOSEPH L. WALTER, OF SAME PLACE.

LAWN-SPRINKLER.

SPECIFICATION forming part of Letters Patent No. 663,277, dated December 4, 1900.

Application filed May 23, 1900. Serial No. 17,753. (No model.)

*To all whom it may concern:*

Be it known that I, LOUIS HORVATH, a citizen of the United States, residing at Los Angeles, in the county of Los Angeles, State of California, have invented new and useful Improvements in Lawn-Sprinklers, of which the following is a specification.

My invention relates to sprinklers that are stationary; and the object thereof is to produce a sprinkler for use with hydrants which will dispense with the use of hose and at the same time will enable the operator to sprinkle a large surface of lawn. I accomplish this object by the device described herein and illustrated in the accompanying drawings, forming a part hereof, in which—

Figure 1:
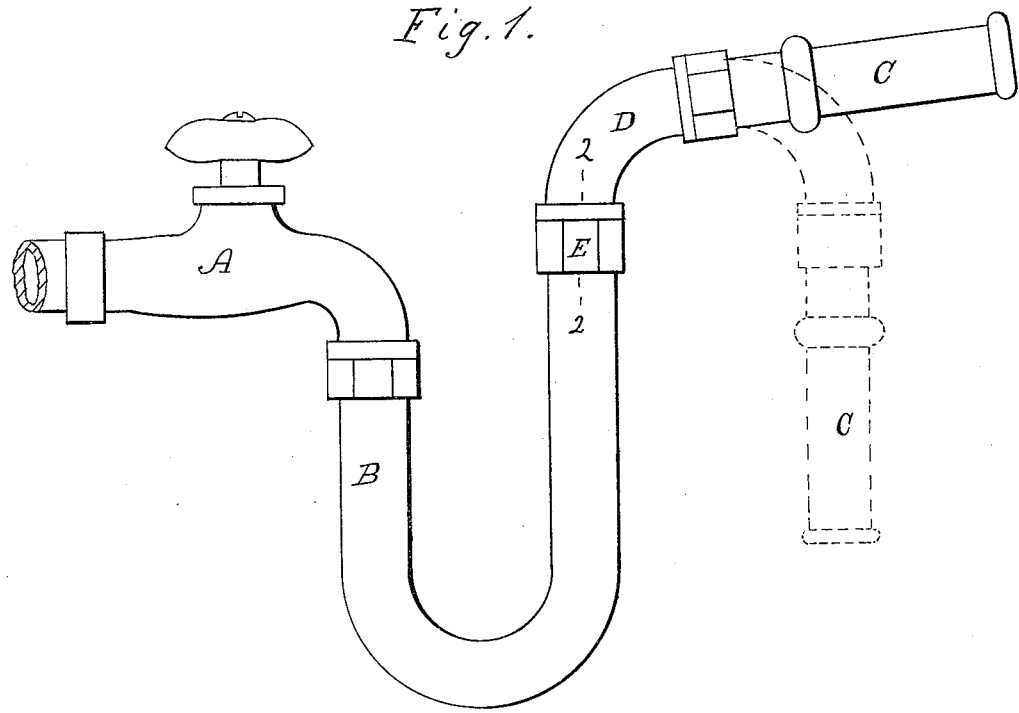
Figure 2:
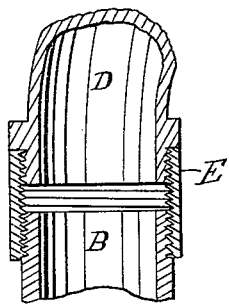

Figure 1 is a side view of my sprinkler attached to a hydrant with the supply-pipe broken away, an additional quadrant-elbow being shown with nozzle attached thereto in dotted lines to illustrate vertical rotation of the nozzle. Fig. 2 is a central vertical sectional view on the line 2 2 of Fig. 1 to illustrate how the quadrant-elbow D may be rotated in coupling-nut E.

In the drawings, A is a hydrant, of ordinary construction, having a downwardly-projecting bib, to which is coupled a U-shaped pipe B. I preferably make the outer leg of the U a little longer than the one coupled to the hydrant to elevate nozzle C above the hydrant. Nozzle C is attached to quadrant-elbow D, which is coupled to the outer leg of pipe B by coupling-nut E, which by unscrewing or turning elbow D backward permits nozzle C to discharge a spray, a sheet, or stream of water in any direction, depending on the construction of the nozzle. The curves in pipe B and elbow D are arcs of a circle, preferably of the same radius. By this construction the greatest freedom of flow of the water is obtained, and I have found by experiment that under twenty pounds pressure a sprinkler thus constructed will from one hydrant water more lawn surface than can be watered with a piece of hose twenty-five feet long from the same hydrant, using the same nozzle. By the use of an additional quadrant-elbow intermediate nozzle C and elbow D the nozzle can be rotated vertically, and thus enable the operator to sprinkle any part of the surface adjacent to the hydrant.

Having described my invention, what I claim as new, and desire to secure by Letters Patent, is—

1. A sprinkler, comprising a U-shaped member having one leg thereof longer than the other, the portions of which that unite the two legs forming a semicircle; a quadrant elbow-shaped member having a curve one-half of that of the semicircular part of the U-shaped member attached to the longer leg of the U-shaped member by a coupling-nut adapted to permit of the rotation of the quadrant-elbow; and a nozzle attached to the other end of the quadrant-elbow.

2. The herein-described sprinkler, comprising the U-shaped pipe B, the legs of which are united by a semicircular-shaped portion adapted to be attached to a hydrant by one of its legs; elbow D whose curve is one-half of that of the semicircular part which joins the legs of the U-shaped member, adapted to be coupled with the other leg of pipe B; and nozzle C, adapted to be coupled to elbow D, in combination with hydrant A.

In witness that I claim the foregoing I have hereunto subscribed my name, this 15th day of May, 1900, at Los Angeles, California.

LOUIS HORVATH.

Witnesses:
JOHN LINDT,
G. E. HARPHAM.